Patented Apr. 22, 1952

2,593,582

UNITED STATES PATENT OFFICE 2,593,582

PROCESS FOR PRODUCING TETRAFLUORO-ETHYLENE POLYMER COMPOSITIONS

John Frank Lontz, Nutley, and Lester Eugene Robb, Rutherford, N. J., assignors to E. I. du Pont de Nemours & Company, Wilmington, Del., a corporation of Delaware No Drawing. Application June 30, 1950, Serial No. 171,536

5 Claims. (Cl. 260—33.6)

This invention relates to new compositions comprising coagulated tetrafluoroethylene polymer and particular hydrocarbon lubricants.

It has been known previously that finely divided polytetrafluoroethylene can be dispersed in various organic media, as well as in an aqueous suspension. It has also been known that polytetrafluoroethylene can be fabricated into shaped articles by subjecting the finely divided polymer to pressure, and thereafter heating the resulting article at a temperature above 327° C. until sintered, and cooling the sintered shaped article. Although highly valuable and useable, these previously known forms of polytetrafluoroethylene and compositions prepared therefrom have not been entirely satisfactory for extrusion and coating applications. Moreover, these previously known methods for shaping polytetrafluoroethylene required long processing cycles and in many instances resulted in the development of flaws and fractures in the shaped products.

It is therefore an object of this invention to provide new compositions based on tetrafluoroethylene polymer which are readily adapted to be extruded, coated, calendered and molded to give articles which are reproducibly accurate in size and shape within small tolerances. Another object is to provide new and useful lubricated polytetrafluoroethylene compositions in the form of a dry molding powder and methods for preparing same. Other objects will be apparent from the description of the invention given below.

The above objects are accomplished according to this invention by the provision of non-aqueous pressure-coalescing compositions comprising colloidal particles of tetrafluoroethylene polymer, which in particular embodiments have been coagulated from an aqueous colloidal suspension of the polymer, intimately admixed with at least one essentially saturated aliphatic and/or cycloaliphatic hydrocarbon, normally liquid at 25° C., and having a boiling point of 220°–400° C. at atmospheric pressure, said hydrocarbon being present in an amount equal to from 15% to 30% of the combined weight of said polymer and hydrocarbon. It is preferred to employ a hydrocarbon or mixture of hydrocarbons having a boiling point in the range of 250°–300° C. The invention also comprises the preparation of a dry molding powder by spraying a mist of the said hydrocarbon onto the dry colloidal polymer particles while the particles are being tumbled in a rotating blender.

Whereas the invention will be described chiefly with respect to polytetrafluoroethylene (i. e., tetrafluoroethylene homopolymer), it is to be understood that the invention also applies to other tetrafluoroethylene polymers. Thus, tetrafluoroethylene copolymers comprising the polymerization product of a mixture of tetrafluoroethylene and another unsaturated organic compound (e. g., ethylene and chlorotrifluoroethylene) containing a terminal ethylenic double bond, said organic compound being copolymerizable with tetrafluoroethylene and being present in said mixture in an amount of up to 15% of the combined weight of tetrafluoroethylene and said organic compound, may be employed in place of polytetrafluoroethylene, provided the presence of the other compounds do not destroy the essential and characteristic qualities of the colloidal particles. Also there may be employed tetrafluoroethylene polymers in which the end groups of the polymer chain are supplied by non-polymerizable compounds (e. g., methanol and ethanol) which are present during the polymerization reaction. The tetrafluoroethylene polymers employed in the practice of this invention embrace the above three types of polymers, it being understood that all the tetrafluoroethylene polymers of this invention possess a high degree of polymerization and a sintering temperature of at least 300° C. Above the sintering temperature such polymers form a gel but they do not actually melt to a liquid. This is in contrast to the known relatively low molecular weight polymers derived from tetrafluoroethylene and certain tetrafluoroethylene polymer waxes, both of which have sharp melting points.

The thoroughly dry non-aqueous lubricated polymer compositions of this invention, which may be prepared by various methods described hereinafter, are pulverulent solids. The compositions as prepared are suitable for directly extruding, calender-rolling, coating, molding, or otherwise fabricating into finished articles without further special treatment.

The following examples illustrate specific embodiments of this invention. All parts are by weight unless otherwise specified, and all aqueous colloidal polymer suspensions were prepared as described in U. S. Serial No. 107,137, filed July 27, 1949, by K. L. Berry. The latter application discloses the polymerization of tetrafluoroethylene at 0° to 100° C. in an aqueous medium in the presence of a water-soluble polymerization catalyst such as disuccinic acid peroxide, i. e., $(HOOCCH_2CH_2COO)_2$, and an alkali metal or ammonium salt of an acid of the formula,

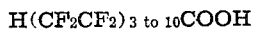
H(CF$_2$CF$_2$)$_{3 \text{ to } 10}$COOH

These acids are obtainable by oxidizing, with a permanganate oxidizing agent, a polyfluoroalkanol of the formula,

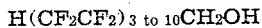
H(CF$_2$CF$_2$)$_{3 \text{ to } 10}$CH$_2$OH

The latter compounds are in turn formed by polymerization of tetrafluoroethylene in the presence of methanol and an organic peroxide catalyst at a temperature between 75° C. and 350° C., as disclosed in U. S. Serial No. 65,063, filed by R. M. Joyce on December 13, 1948, now Patent Number 2,559,628.

Example 1.—One hundred twenty-five parts of a 60% solids aqueous colloidal suspension of polytetrafluoroethylene (75 parts polymer and 50 parts water) is extended with 167 parts distilled water. To this is added 25 parts of a commercial grade of white mineral oil (i. e. liquid petrolatum, known as "Primol") consisting of a naturally occurring mixture of paraffinic and naphthenic hydrocarbons substantially free of unsaturates (average molecular weight 413.5; boiling range 330°–390° C.; viscosity 115.6 cps. at 26° C.). The resulting mixture of aqueous polymer suspension and oil is whipped to an emulsion in a Waring Blendor while a mixture of 83 parts water and 66 parts acetone is added to coagulate the dispersed polymer. After approximately 3 minutes of agitation following the completed addition of the aqueous acetone, the lubricated coagulated polymer is filtered under strong suction and dried at 110° C. to expel any occluded water.

The resulting dried mixture is a soft, white, nearly grainy product which is readily extruded, calender-rolled, or molded into all sorts of shapes. The lubricant remaining after these fabricating operations may be removed either by extracting in such solvents as hexane, naphtha, toluene, etc., or volatilizing in a heated chamber. The lubricant-free article is then fused to a hard, tough material by heating at a temperature above 327° C., the transition point of the polymer.

The following illustrates the utility of the above dry, lubricated molding powder composition. The composition is placed in an extrusion chamber fitted with an hydraulically-operated piston to force the lubricated polymer sidewise through a circular orifice tapered to a 0.040-inch opening, thereby forming a continuous length of a circular beading or filament. The extrusion is accomplished at room temperature with a pressure of approximately 2,000 lbs. on a 1.25 inch diameter ram. In this form, the lubricated polymer mixture is particularly suited for rolling into a tape or ribbon-like material by passing between a pair of calendering or smooth-surfaced rolls. From the 0.040-inch beading a tape 0.34-inch wide and 0.006-inch thick is formed. This tape is next freed of the contained lubricant by immersing in toluene which serves as an extracting solvent. The tape is then sintered by passing through a pipe, 1-inch in the inside diameter, electrically-heated to an inner temperature of 350–380° C. The resulting tape has a near-transparent, bluish appearance. On testing, it shows an average tensile strength of 3220 lbs./sq. in. and an average elongation of 200 per cent as determined by the A. S. T. M. test method designated as D-412-41. The tape made by this method is useful as a dielectric insulation for such electrical components as cables, coils, armatures, etc.

Example 2.—A lubricated polymer composition in the form of a dry powder is prepared by the same procedure as described in Example 1 but using instead 81.8 parts of polytetrafluoroethylene and 18.2 parts of white mineral oil.

The dry powder is placed in an extrusion chamber fitted with an hydraulically-operated piston to force the lubricated polymer through a slit die 1.50 inches wide with a 0.010 inch opening, forming a continuous length of a flat ribbon or tape. In this form, the lubricated polymer mixture is particularly suited for rolling into even thinner ribbon or tape to a thickness down to 0.0005 inch. This tape is next freed of the contained lubricant by extracting in toluene. The extracted tape is then sintered by passing through a heated chamber at a temperature of 350–380° C. The resulting tape has a near-transparent, slightly opalescent appearance with the characteristic toughness equivalent to polytetrafluoroethylene fabricated by other methods such as molding.

Example 3.—An aqueous colloidal suspension of polytetrafluoroethylene is coagulated by high-speed stirring and the coagulated polymer is filtered by suction and dried at 110° C. To 119 parts of methanol are added 75 parts of the dried coagulated polymer and 2.38 parts of a polyethylene glycol ether of an alkylated phenol (an non-ionic dispersing agent known commercially as "Triton" N–100) in a Waring Blendor, and the resulting slurry is agitated at moderate speeds. To the mixture is added 25 parts of a commercial grade of cetane (distillation range 252° C.–274° C.; viscosity 3.5 cps. at 25° C.) with agitation, which is continued for 15 seconds after the addition is completed. The lubricated polymer is filtered under suction giving a filter cake that resembles a fine powder. This powder is dried at 110° C. in an air oven for 20 minutes to remove any retained methanol.

The lubricated polymer is suitable for extrusion into beading, tape, tubing, or as coating on wire by extrusion. The cetane is removed from the extruded form by vaporization in an air oven and the polymer is fused to complete particle coalescence at temperatures above its transition point, 327° C.

Example 4.—Eighty parts of the same coagulated dried unlubricated polytetrafluoroethylene as that used in Example 3 is placed in the bottom of a closed rotatable double-cone blender having a tubular shaft through which liquid may be introduced from an exterior reservoir. In this blender the shaft is provided with a pair of misting nozzles through which 20 parts of cetane, the same as that used in Example 3, is slowly forced from the reservoir by means of air or nitrogen pressure. A by-pass from the pressure source is introduced to the orifice within the cetane line so that the gas passing through the orifice atomizes and dilutes the cetane to produce a fine mist at the nozzle exits. The injection is started by applying an air or nitrogen pressure of 50 lbs./sq. in. to the reservoir and the by-pass orifice. The injection rate is controlled to 0.0125 part of cetane per minute per part of polymer. The blender is meanwhile rotated at a speed of 15 R. P. M. during 20 minutes of injection and 30 minutes of subsequent blending. After the completion of this typical cycle, the lubricated polymer in the form of a dry, free-flowing powder is then withdrawn and is ready for rolling, extrusion, and other forming operations for making film, sheeting, filament, or coating on wires.

The tetrafluoroethylene polymer for use in this invention may be obtained by coagulating an aqueous colloidal suspension of the polymer. It has been found that other finely divided forms of polytetrafluoroethylene, such as the granular form obtained by direct polymerization in accordance with U. S. Patents 2,230,654; 2,393,967; and 2,394,243, the micro-pulverized form, or any other form which has been mechanically sub-divided from the massive polymer cannot readily be extruded or molded under pressure to yield satisfactory articles. For example, when the granular form of polytetrafluoroethylene, prepared according to the above patents and then disintegrated into small particles, is mixed with cetane (75% polymer, 25% cetane), one of the preferred hydrocarbons for use in this invention, and extruded into tape through a 0.010 inch slit die at approximately 26° C., the mixture of polymer and cetane extrudes as a non-cohesive powder. The cetane actually exudes from the mixture upon application of slight pressure, resulting in a discontinuous tape of non-uniform caliper. The granular polymer/cetane mixture is quite different from the corresponding coagulated polymer/cetane mixture in that the former shows no pressure-coalescing property when pressed on a flat surface, whereas the pressure-coalescing property is characteristic of the latter compositions.

The process of preparing the aqueous suspension of tetrafluoroethylene polymer is not the subject of this invention. However, suitable aqueous suspensions of polytetrafluoroethylene may be obtained by the methods described in U. S. Serial No. 713,385, filed November 30, 1946, by M. M. Renfrew, now Patent Number 2,534,058, U. S. Serial No. 107,137, filed July 27, 1949, by K. L. Berry, and U. S. Patent 2,478,229. Aqueous suspensions of tetrafluoroethylene copolymers may be obtained by the methods described in U. S. Serial No. 107,137, filed July 27, 1949, by K. L. Berry. Aqueous suspensions of tetrafluoroethylene polymers in which the end groups of the polymer chain are supplied by non-polymerizable compounds may be obtained by the same method as that described for the preparation of the polytetrafluoroethylene suspension as typified by Batch D of Example X in U. S. Serial No. 107,137, filed July 27, 1949, by K. L. Berry, except that, for example, 0.075 part of methanol as the non-polymerizable compound is added with the other reactants to the pressure vessel prior to polymerization. The particle size of the polymer evidently is rather highly critical, i. e., it should be colloidal before coagulation, and the smaller the particles the more easily the lubricated composition may be fabricated into articles. The particle size of the polymer in the suspensions described in the above-mentioned applications and patent in general ranges from 0.05 to 5 microns, which is the diameter of the average particle determined by an electron microscope measurement on a dried film obtained by depositing a highly diluted aqueous suspension of the polymer on a surface. These colloidal suspensions have been found quite suitable for coagulation in preparing the compositions of this invention. The colloidal particles of polytetrafluoroethylene retain their particulate form during coagulation although agglomeration may occur to some extent, whereby individual particles attach themselves to other particles without necessarily losing their identity, but this does not affect their ability to be fabricated when combined with the hydrocarbons of this invention. The coagulated mass is thus a characteristic physical form of the polytetrafluoroethylene. Moreover, polytetrafluoroethylene is virtually insoluble in practically all known solvents, and therefore the particles do not coalesce when merely suspended in organic media. To coalesce the particles in the composition of this invention it is necessary to subject them to the action of heat and/or pressure. The colloidal particles possess marked adsorptive properties, and can be employed, for example, as adsorbents for hydrocarbons in much the same manner as charcoal or other highly adsorptive solid materials. In this respect the colloidal form of polytetrafluoroethylene differs from other finely divided forms of the polymer.

There are several reasons why the properties of a particular group of hydrocarbons is critical in this invention. As set forth above, either a single hydrocarbon or a mixture of two or more synthetic or naturally-occurring hydrocarbons may be used, but they should be normally liquid at 25° C. (i. e., at atmospheric pressure) and should have a boiling point in the range of 220° C. to 400° C. Although several methods of preparing the lubricated compositions of this invention have been disclosed herein, by far the best results are obtained by misting the hydrocarbon onto the dried polymer particles. This method yields the most homogeneous compositions with respect to uniform incorporation of the lubricant throughout the mass of polymer particles. Small degrees of non-homogeneity in the compositions show up in large variations in pressure during extrusion of the compositions if the hydrocarbon lubricant has not been uniformly incorporated so that each polymer particle is surrounded by a liquid film of the hydrocarbon. Consequently, the hydrocarbon should be liquid at room temperature (i. e. 25° C.) to readily permit spraying or atomizing the hydrocarbon under pressure in the form of a fine mist or fog, which is generally propelled in a stream of inert gas such as carbon dioxide or nitrogen to permit adequate control of the misting rate. The hydrocarbon could be a solid at 25° C. and be dissolved in a solvent and the solution sprayed onto the polymer particles; however, the solvent then would have to be removed which is an additional step requiring added time and expense. Furthermore, it is much more difficult to control spraying of a solution than of a liquid of relatively narrow boiling range.

The preferred boiling range for the hydrocarbon is 250° C. to 300° C. The lower limit of the boiling range is set by the volatility of the hydrocarbon during extrusion under pressure. By this is meant that a hydrocarbon boiling much below 250° C. at atmospheric pressure volatilizes too rapidly during room temperature extrusion of the lubricated polymer at commercial rates (and even more rapidly at elevated extrusion temperatures) to permit accurate control of the caliper of the extruded articles. In other words, starting with a lubricated polymer containing 18% of lubricant of a boiling point say 100° C., it has been found that upon analysis the extruded article before intentional removal of the lubricant and before sintering may contain only 10% of lubricant, the remaining lubricant having been lost during the extrusion operation. Furthermore, these particular extruded articles are not of reproducible caliper; that is, tapes, filaments and coatings over wire cannot be held to close tolerances without constant manual control and supervision throughout the extrusion operation. Even though constant vigilance attends the extrusion, the pressure variations due to loss of lubricant may be too great and the changes too rapid to hold the caliper constant even with repeated manual adjustments. The upper limit of the boiling range of the hydrocarbon is set chiefly by a balance between two factors; i. e., the time required for removing all of the hydrocarbon prior to sintering the extruded articles and the amount of charring which occurs in exposing the extruded article containing the hydrocarbon to elevated temperatures. By way of explanation, it is desired to use a hydrocarbon with as low a volatility as possible to permit ready removal by volatilization within a short time, and further it is preferred to remove substantially all of the hydrocarbon prior to the time when the extruded article reaches the sintering temperature (i. e., 327° C. for polytetrafluoroethylene). Prolonged heating of the extruded articles containing hydrocarbons, especially those having boiling points above 325° C., results in a certain amount of charring, and in general, the longer the heating cycle the greater the charring. This charring increases the power factor and dielectric constant of the sintered shaped article which is quite undesirable for some of the more important electrical applications for polytetrafluoroethylene. In addition, as the boiling point of the hydrocarbon rises above 325° C., the melting point also begins to rise so that very soon the hydrocarbons are no longer sprayable at room temperature, which is a disadvantage. From the above discussion, it will be seen that a relatively narrow range of hydrocarbons is particularly valuable for carrying out the objects of this invention in providing a combination of (1) a rapid effective method of incorporating the hydrocarbon into the polymer particles, (2) a method of extruding the lubricated polymer with a minimum of effort and control to obtain shaped articles of reproducible caliper, and (3) a method of obtaining rapid and substantially complete removal of the hydrocarbon prior to sintering the shaped article.

Examples of suitable hydrocarbons falling within the scope of this invention include n-tridecane, dipropylhexylmethane, n-tetradecane, n-pentadecane, n-hexadecane (cetane), 7,8-dimethyltetradecane, n-heptadecane, paraffin oils, mineral oils, and commercially available synthetic and/or natural mixtures of two or more essentially saturated aliphatic and/or cycloaliphatic hydrocarbons within the boiling point range of 220° C. to 400° C. Minor amounts of unsaturated aliphatic hydrocarbons are usually present in commercial grades of the paraffin hydrocarbons, but these do not interfere with the practice of this invention, and for this reason the hydrocarbons are termed "essentially saturated."

The proportion of hydrocarbon in the compositions is as critically important as the properties of the hydrocarbon. Compositions containing much less than 15% of the hydrocarbons of this invention reduce the rate of extrusion to such an extent that abnormally high pressures develop and cause "fibering" of the polymer during extrusion. If more than 30% hydrocarbon is used, the shrinkage of the sintered article becomes too great and in some cases cracks and fissures may develop due to abnormally high shrinkages. The larger proportions of hydrocarbon allow an increased rate of extrusion at decreased pressures, but as pointed out, there is a limit in that too much hydrocarbon in the lubricated polymer will yield a composition which has a soupy consistency and is difficult to handle in the extruder, mold, or other fabricating apparatus. Also, too great a proportion of hydrocarbon means that the flow of the composition and the developed pressure cannot be controlled to give accurate tolerances in the fabricated articles, as well as preventing uneconomical disadvantages in removal of the hydrocarbon lubricant. All percentages of hydrocarbons throughout the specification are based upon the combined weight of dry tetrafluoroethylene polymer and hydrocarbon in the composition.

The compositions of this invention may be prepared by a variety of methods. One such method comprises intimately mixing the hydrocarbon with an aqueous suspension of colloidal polytetrafluoroethylene under high speeds of agitation with or without a dispersing agent, followed by coagulation accomplished by the addition of either an electrolyte or a water-miscible organic liquid such as acetone or alcohol. In this method it is preferred to use one of the many suitable dispersing agents disclosed in U. S. Patent 2,478,229. An equally satisfactory method for obtaining the compositions involves coagulating an aqueous suspension of colloidal polytetrafluoroethylene, drying the coagulated polymer, suspending the coagulated polymer in an organic liquid vehicle which may be soluble in the hydrocarbon (e. g., methanol or tertiary butanol), and then adding the hydrocarbon with continuous stirring, followed by filtering or evaporation of the suspending vehicle. A third method comprises spraying a mist of the hydrocarbon onto the dry coagulated polymer particles while the particles are being tumbled in a rotating blender. A fourth method employs high speed agitation of the dried coagulated polymer in the presence of the hydrocarbon. The only requirement for preparing satisfactory compositions is to thoroughly and intimately disperse the hydrocarbon throughout the particles of the coagulated polymer. As pointed out above, it is preferred to use the spraying method for preparing the compositions of this invention because this method yields far superior results.

Other materials may be incorporated in the compositions of this invention depending upon the properties desired in the finished articles fabricated from the compositions. Thus, it has been found that finely divided solid fillers, pigments, dyes, other lubricants (e. g., silicone oils (polyorganosiloxanes), high-boiling esters such as dibutyl phthalate and tricresyl phosphate, naturally occurring low-melting waxes, and fluorinated hydrocarbon oils, all of which should have a viscosity of 0.45 to 1000 centipoises at 25° C.), plasticizers, and the like may be added to the compositions in varying amounts. Examples of suitable fillers and pigments which may thus be employed include carbon black, graphite, mica, talc, silica, asbestos, and titanium dioxide. All of these fillers and pigments should be in finely divided form and preferably should be of the approximate particle size of the polymer used in the mixture. The fillers and pigments may be employed in amounts varying from relatively small amounts up to as much as 400%, based on the dry weight of the tetrafluoroethylene polymer in the composition. All of these additional modifiers may be incorporated into the composition at any time prior to fabrication into the finished article. The fillers and pigments serve either to color the polymer or to extend and reinforce the polymer, resulting in mixtures having increased elongation in some cases and in mixtures having a lower cost where a cheap filler is selected. However, if the best electrical properties inherent in the polytetrafluoroethylene are desired, it will generally not be practical to employ large amounts of these other additives.

The chief advantage of this invention is that the polytetrafluoroethylene compositions may readily be extruded at relatively low temperatures (i. e., at 15° C. to 150° C.) under compacting pressure into various shapes at rates up to and sometimes over 50 feet per minute, whereas prior to this invention melt extrusion rates were limited to approximately 50 feet per hour at much higher temperatures. These extruded shapes may readily be freed from all hydrocarbons by either volatilizing the hydrocarbon or extracting the hydrocarbon with a solvent. Following removal of the hydrocarbon the shaped article is baked at a temperature above 327° C. until sintered, and thereafter either annealed or quenched. The process of preparing extruded articles from lubricated polytetrafluoroethylene is more fully described and claimed in U. S. Serial No. 171,534, filed by Llewellyn and Lontz on June 30, 1950.

Another advantage of this invention is that the compositions provide a means for molding polytetrafluoroethylene at temperatures as low as room temperature and above into useful articles, following which the hydrocarbon may be removed as above and the article finally sintered at a temperature above 327° C. Still another advantage of the compositions of this invention lies in the fact that they may be calendered over asbestos, paper, cloth, foil and the like, following which the hydrocarbon may be removed as above and the extruded article sintered at a temperature above 327° C. if desired. For example, the composition may be coated by spreading, by using a doctor knife, or by rolling the composition onto supporting structures such as asbestos cloth, webbing, boards, porous ceramic surfaces, glass cloth, metal screens, and the like.

The compositions of this invention are useful for extrusion into various forms such as filaments, beading, films, sheets, tubes, rods, tapes; extrusion coatings on wires, calender rolling into sheets; coating and calendering over paper, cloth, foil, and the like; and for molding into various articles. Another particularly suitable application involves use of the compositions for bonding or repairing sections of polytetrafluoroethylene film or sheeting. For example, several sections of an unbaked, unsintered sheet extruded from one of the lubricated polymer compositions of this invention have been lapped and securely bonded to give satisfactory bonds.

Another application for the compositions of this invention involves a simplified method for joining spliced sections of polytetrafluoroethylene coated wire conductors. This method involves the steps of wrapping the spot to be spliced with one or more layers of unsintered lubricated polytetrafluoroethylene tape extruded from one of the lubricated compositions of this invention, and thereafter heating the resulting assembly above 327° C. to sinter the whole and effect bonding to the conductor and its coating. The same wrapping technique may be applied to the covering of other metal articles such an iron magnets, coils, and the like where it is desired to cover the article with a chemically-inert, corrosion-resistant, electrical insulating covering.

We claim:

1. A process for preparing a non-aqueous pressure-coalescing composition which comprises contacting dry tetrafluoroethylene polymer particles of colloidal size with an atmosphere comprising a mist of at least one essentially saturated hydrocarbon having a boiling point of 220° C. to 400° C. at atmospheric pressure from the group consisting of aliphatic and cycloaliphatic hydrocarbons, and intimately mixing said polymer particles and hydrocarbon mist until a uniform intimate mixture is obtained in the form of a dry, free-flowing powder, the weight of said hydrocarbon being from 15% to 30% of the combined weight of said tetrafluoroethylene polymer and hydrocarbon.

2. The process of claim 1 in which the mixing of said polymer particles with said hydrocarbon is accomplished by spraying a mist of the hydrocarbon onto the polymer particles while the particles are being tumbled.

3. The process of claim 1 in which the said hydrocarbon has a boiling point of 250° C. to 300° C. at atmospheric pressure.

4. The process of claim 1 in which the said hydrocarbon is a mixture of hydrocarbons having a boiling range of 252° C. to 274° C. at atmospheric pressure.

5. The process of claim 1 in which the said tetrafluoroethylene polymer is polytetrafluoroethylene.

JOHN FRANK LONTZ.
LESTER EUGENE ROBB.

REFERENCES CITED

The following references are of record in the file of this patent:

UNITED STATES PATENTS

| Number | Name | Date |
| --- | --- | --- |
| 2,230,654 | Plunkett | Feb. 4, 1941 |
| 2,510,078 | Compton et al. | June 6, 1950 |